(12) United States Patent
Schultz (10) Patent No.: US 8,408,512 B2
(45) Date of Patent: Apr. 2, 2013

(54) BAYONET MIRROR MOUNT

(75) Inventor: Gregory Russell Schultz, Marana, AZ (US)

(73) Assignee: Olive Tree Financial Group, L.L.C., Tucson, AZ (US)

( * ) Notice: Subject to any disclaimer, the term of this patent is extended or adjusted under 35 U.S.C. 154(b) by 102 days.

(21) Appl. No.: 13/106,459

(22) Filed: May 12, 2011

(65) Prior Publication Data

US 2012/0286124 A1 Nov. 15, 2012

(51) Int. Cl.
*A47G 1/16* (2006.01)

(52) U.S. Cl. ..................... 248/475.1; 248/694

(58) Field of Classification Search ............... 248/475.1, 248/466, 694, 682, 200
See application file for complete search history.

(56) References Cited

U.S. PATENT DOCUMENTS

| | | | |
|---|---|---|---|
| 2,107,791 A | 2/1936 | Henning | |
| 3,829,199 A | 8/1974 | Brown | |
| 4,500,063 A * | 2/1985 | Schmidt et al. | 248/475.1 |
| 4,629,425 A | 12/1986 | Detsch | |
| D355,225 S * | 2/1995 | Arad et al. | D21/568 |
| 6,220,717 B1 * | 4/2001 | Pastore | 359/871 |
| 6,698,906 B1 | 3/2004 | Tally | |
| 7,896,508 B2 * | 3/2011 | Dyson | 359/871 |

OTHER PUBLICATIONS

War Department, TR 1320-B Fire-Control and Sighting Equipment Small Arms and Special Infantry Weapons, Apr. 2, 1927, pp. 64-65.

* cited by examiner

*Primary Examiner* — Ramon Ramirez
(74) *Attorney, Agent, or Firm* — Stinson Morrison Hecker LLP (57) ABSTRACT

A mount for mounting a mirror on a knife. The knife has a blade, a blade tip, and a handle. The mount has a base that is configured to engage a mirror, and a housing that is coupled with the base. The housing defines a cavity that is configured for receiving at least a portion of the knife blade such that the blade tip is substantially enclosed by the housing when the blade is positioned in the cavity. Preferably, the housing encloses approximately between 1 to 5 inches of the knife blade.

20 Claims, 9 Drawing Sheets

BAYONET MIRROR MOUNT

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention relates generally to a mount, and more particularly to a mount that is operable to mount a mirror on a knife.

2. Description of Related Art

A mirror mount that is capable of mounting a mirror on a knife was produced for use by soldiers during World War I. The mirror mount allowed a soldier to mount a mirror on a knife or bayonet for the purpose of extending the mirror into a dangerous area and expanding the soldier's field of view without exposing the soldier to harm. While the WWI mirror mount generally worked for its intended purpose, it did not allow a soldier to quickly and safely mount a mirror on a knife without danger of cutting his or her hand on the knife blade due to the fact that the mount did not substantially enclose the tip of a knife to which it was mounted.

BRIEF SUMMARY OF THE INVENTION

The present invention is directed toward a mount for mounting a mirror on a knife having a blade, a blade tip and a handle. The mount has a base that is configured to engage the mirror, and a housing that is coupled with the base. The housing defines a cavity that is configured for receiving at least a portion of the knife blade such that the blade tip is substantially enclosed by the housing when the blade is positioned in the cavity. Preferably, the housing encloses portions of first and second edges of the blade that meet at the blade tip. Most preferably, the housing encloses approximately between 1 to 5 inches of the knife blade, including its edges, in addition to enclosing the blade tip. The housing preferably also engages a portion of the blade for retaining the housing on the blade. When the mirror mount is mounted on a knife, a user can extend the knife and mirror into a dangerous area and expand the user's field of view without exposing the user to harm.

Because the mirror mount substantially encloses the blade tip of a knife to which it is mounted, a user of the mount can quickly and safely mount the mirror mount to a knife without danger of cutting his or her hand on the knife blade. This feature is extremely advantageous for individuals facing dangerous life or death situations, such as military soldiers and police officers, because they can rely on and use the mount in a quick and safe manner.

Additional aspects of the invention, together with the advantages and novel features appurtenant thereto, will be set forth in part in the description which follows, and in part will become apparent to those skilled in the art upon examination of the following, or may be learned from the practice of the invention. The objects and advantages of the invention may be realized and attained by means of the instrumentalities and combinations particularly pointed out in the appended claims.

DETAILED DESCRIPTION OF PREFERRED EMBODIMENT

Figure 1:
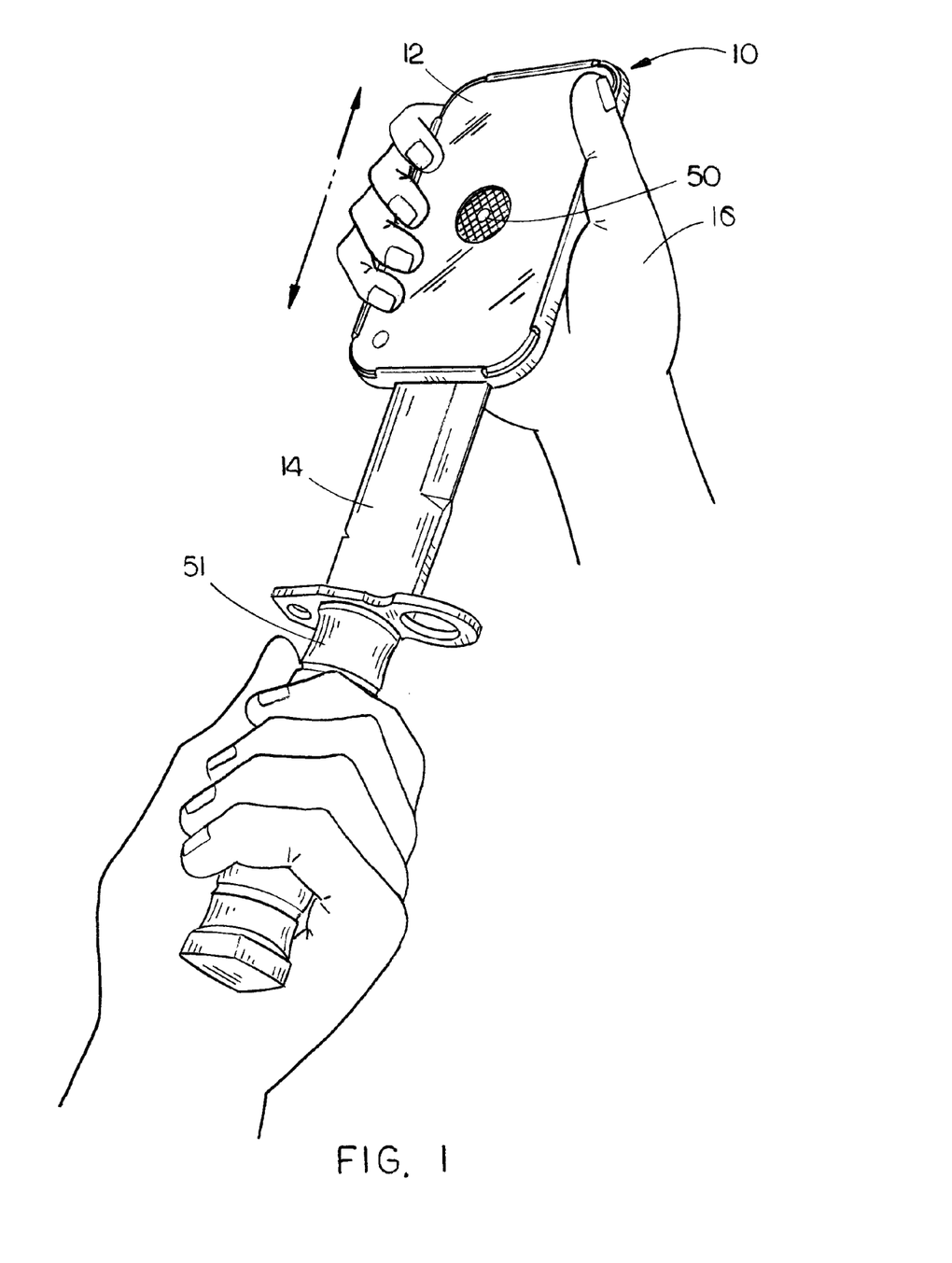
FIG. 1 is a perspective view of a mount according to one embodiment of the present invention in the process of being mounted on a knife.
Figure 2:
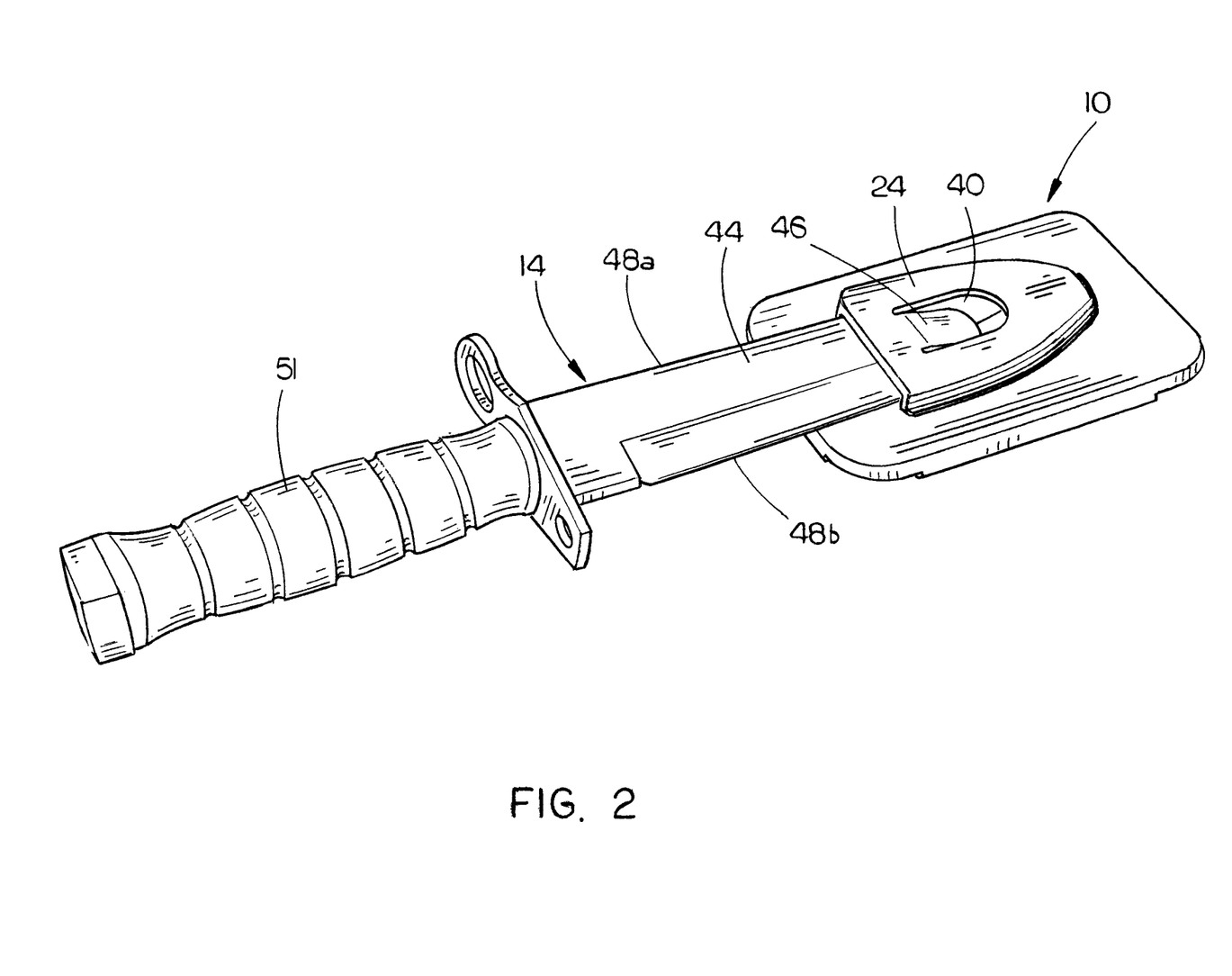
FIG. 2 is a rear perspective view of the mount of FIG. 1 mounted on the knife.

Referring to FIG. 1, an exemplary embodiment of a mount in accordance with the present invention is shown and designated by the reference numeral 10. The mount 10 engages a mirror 12 and has a housing structure, which is described in detail below, that receives a portion of a knife 14 for mounting the mirror 12 on the knife 14. Due to the structure of the mount 10 a user can safely grasp the mount 10 with his or her hand 16 and quickly engage or disengage the mount 10 with the knife 14 without danger of cutting his or her hand 16 on the knife 14. While the mount 10 is operable to be used with any type of knife 14, preferably the mount 10 is used with a bayonet that is operable to be mounted on a rifle. When the mount 10 is mounted on a bayonet which is mounted to a rifle, a user of the rifle can extend the bayonet, mount 10 and mirror 12 into a potentially dangerous area, such as around a corner or in a hole, and use the mirror 12 to enhance his or her field of view without entering the potentially dangerous area.

Figure 4:
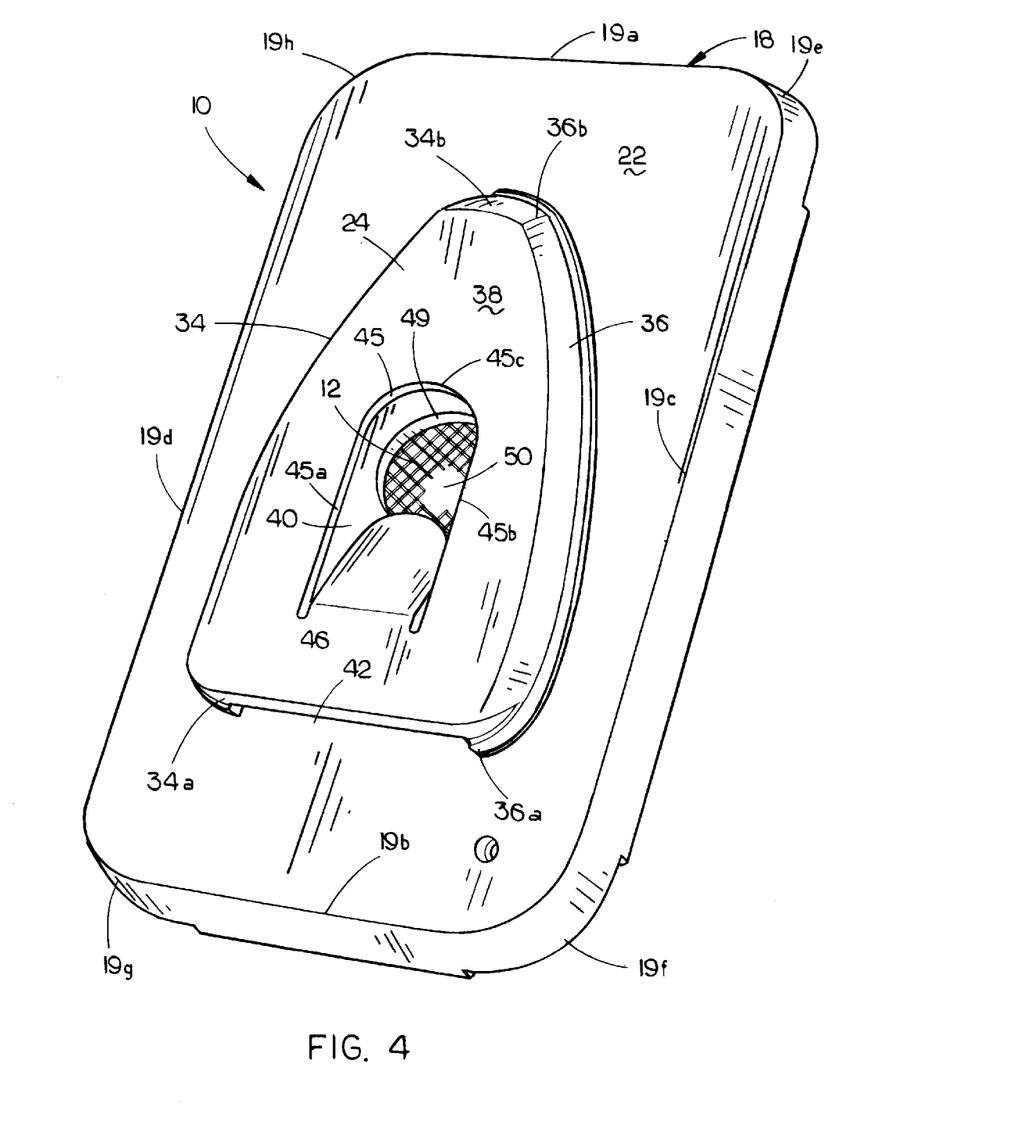
FIG. 4 is a rear perspective view of the mount.
Figure 5:
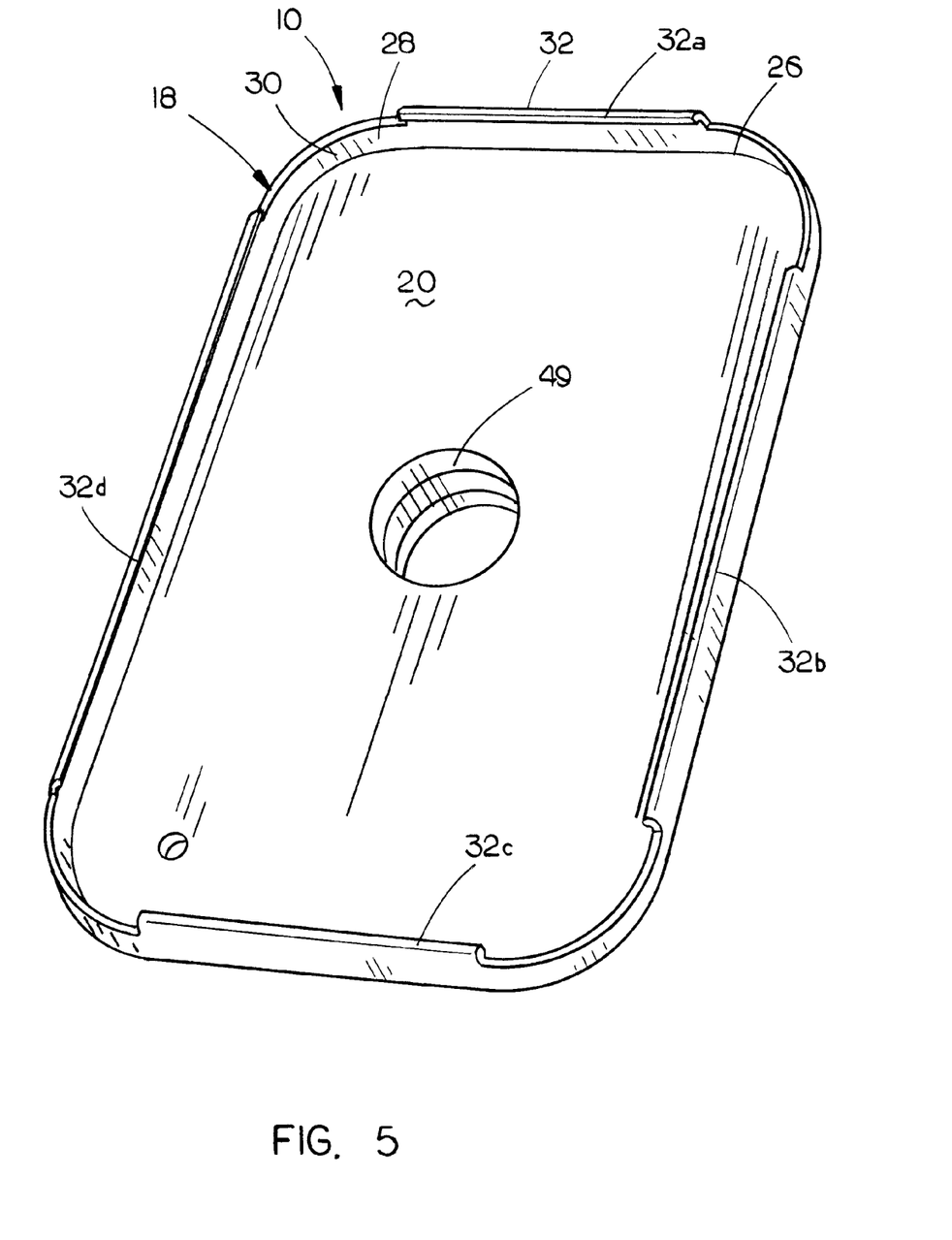
FIG. 5 is a front perspective view of the mount without a mirror.

Referring now to FIGS. 4 and 5, the mount 10 has a base 18 with a front surface 20 (FIG. 5) and a rear surface 22 (FIG. 4). The mirror 12, shown in FIGS. 1 and 4, is positioned adjacent to the front surface 20 when the mirror 12 is engaged by the mount 10. A housing 24, shown in FIG. 4, is joined with and extends from the rear surface 22 of base 18. The housing 24 is configured for receiving a portion of a knife blade in order to mount the mount 10 and mirror 12 on a knife 14. Preferably, the housing 24 is integral with the rear surface 22 of the base 18.

The base 18 may be constructed from any suitable material including metal, such as aluminum, titanium, stainless steel or steel, or a polymeric material, such as a thermoset, thermoplastic, elastomer, rubber, nylon, polyethylene, polystyrene, acrylonitrile butadiene styrene, polycarbonate, polypropylene or combinations thereof. Preferably, the base 18 is formed from a resilient, polymeric material. The housing 24 is preferably integral with and constructed from the same material as the base 18.

Referring to FIG. 4, the base 18 is generally rectangular with sides 19a-d that meet at rounded corners 19e-h. Each of the sides 19a and 19b preferably has a length of between approximately 2 to 4 inches, and most preferably approximately 3 inches. Each of the sides 19c and 19d preferably has a length of between approximately 3 to 7 inches, and most preferably approximately 5 inches.

Figure 6:
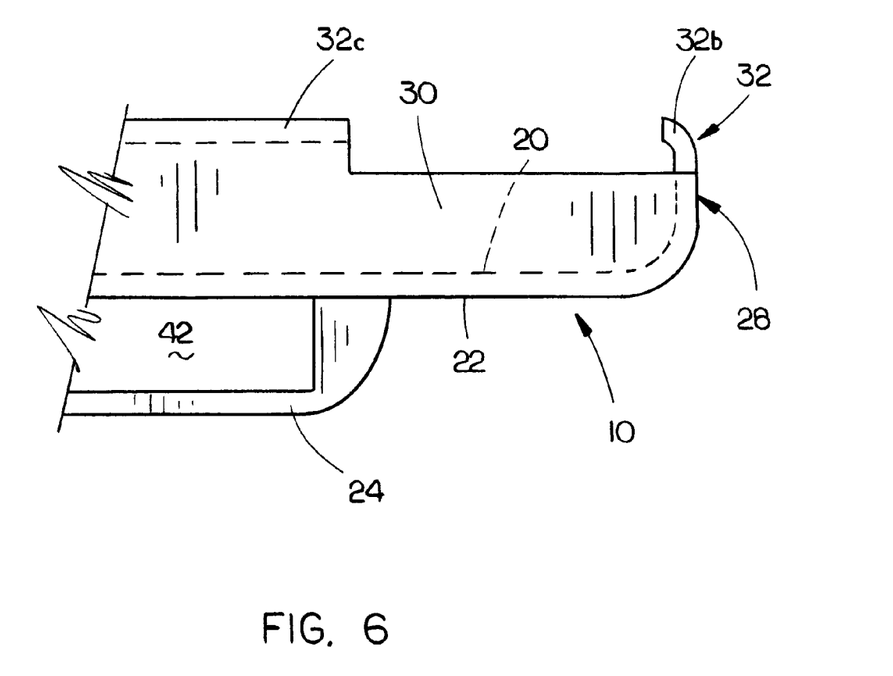
FIG. 6 is a partial side elevational view of the mount.

Referring to FIG. 5, the front surface 20 of the base 18 has a peripheral edge 26. The base 18 has a side wall 28 that is joined with and extends from the peripheral edge 26 of the front surface 20. Preferably, the side wall 28 is integral with the front surface 20. The side wall 28 includes a first section 30 that is joined with and generally perpendicular to the front surface 20. The side wall 28 also includes a second, curved section 32 that is joined to the first section 30 and that curves to partially extend over the front surface 20, as shown in FIG. 6. As shown in FIG. 5, the second, curved section 32 is discontinuous such that there are four separate curved sections 32*a-d* extending from the first section 30. Each of sections 32*a-d* is generally linear because the second, curved section 32 does not extend from the first section 30 in the rounded corners 19*e-h* of the base 18. The second, curved section 32 partially extends over the front surface 20 so that when mirror 12 is positioned adjacent to front surface 20, the second section 32 frictionally engages mirror 12, as shown in FIG. 1, for removably retaining the mirror 12. The side wall 28 is preferably sized and configured for retaining a military emergency signaling mirror that is produced according to specification MIL-M-18371E. The side wall 28 preferably has a height from front surface 20 to second, curved section 32 of approximately 0.25 inches, which is also preferably approximately the thickness of mirror 12.

Referring now to FIG. 4, the housing 24 includes first and second side walls 34 and 36 that are each joined with and extend from the rear surface 22 of the base 18. A back wall 38 is joined with and extends between the side walls 34 and 36. The back wall 38 is preferably integral with the side walls 34 and 36. The side walls 34 and 36 and back wall 38 of the housing 24 and rear surface 22 of the base 18 define a cavity 40. The first and second side walls 34 and 36 are curvilinear and mirror images of each other. Each of the side walls 34 and 36 has a first end 34*a* and 36*a*, respectively, and a second end 34*b* and 36*b*, respectively. The first ends 34*a* and 36*a* are spaced apart to present a gap 42 that receives a portion of knife blade 44, as described in detail below, so that the knife blade 44 is positioned within cavity 40. The second ends 34*b* and 36*b* are joined and preferably integral. The side walls 34 and 36 and back wall 38 are preferably sized and configured for receiving the blade 44 of an M9 bayonet.

The back wall 38 has an opening 45 that is surrounded by sides 45*a*, 45*b* and 45*c*. Sides 45*a* and 45*b* are approximately parallel with side walls 34 and 36, respectively. Side 45*c* is curvilinear and joins the sides 45*a* and 45*b*. There is a tab 46 that is opposite from side 45*c* and that is joined with and extends downward from the back wall 38 through the opening 45 into the cavity 40. The tab 46 is preferably integral with the back wall 38. The tab 46 exerts pressure on the knife blade 44 when it is positioned in the cavity 40 in order to assist in retaining the mount 10 on the knife blade 44. The mount 10 is also retained on the knife blade 44 via friction between the interior surfaces of walls 34 and 36 and the edges 48*a* and 48*b* (FIG. 3) of the blade 44. The tab 46 and side walls 34 and 36 preferably frictionally engage the knife 14 so that a user of the mount 10 must grasp the mount and pull it off the knife 14 in order to remove it. Thus, the tab 46 and side walls 34 and 36 ensure that the mount 10 will not undesirably fall off of the knife 14 when in use.

The opening 45 in housing 24 is aligned with an opening 49 in base 18. The aligned openings 45 and 49 are also aligned with the sighting hole 50, shown in FIG. 1, of the military emergency signaling mirror 12. Aligned openings 45 and 49 allow a user of the mount 10 to look through sighting hole 50 from the rear surface 22 of the base 18 and utilize the mirror 12 as an emergency signaling device, as is well known in the art, without removing the mirror 12 from the mount 10.

Figure 3:
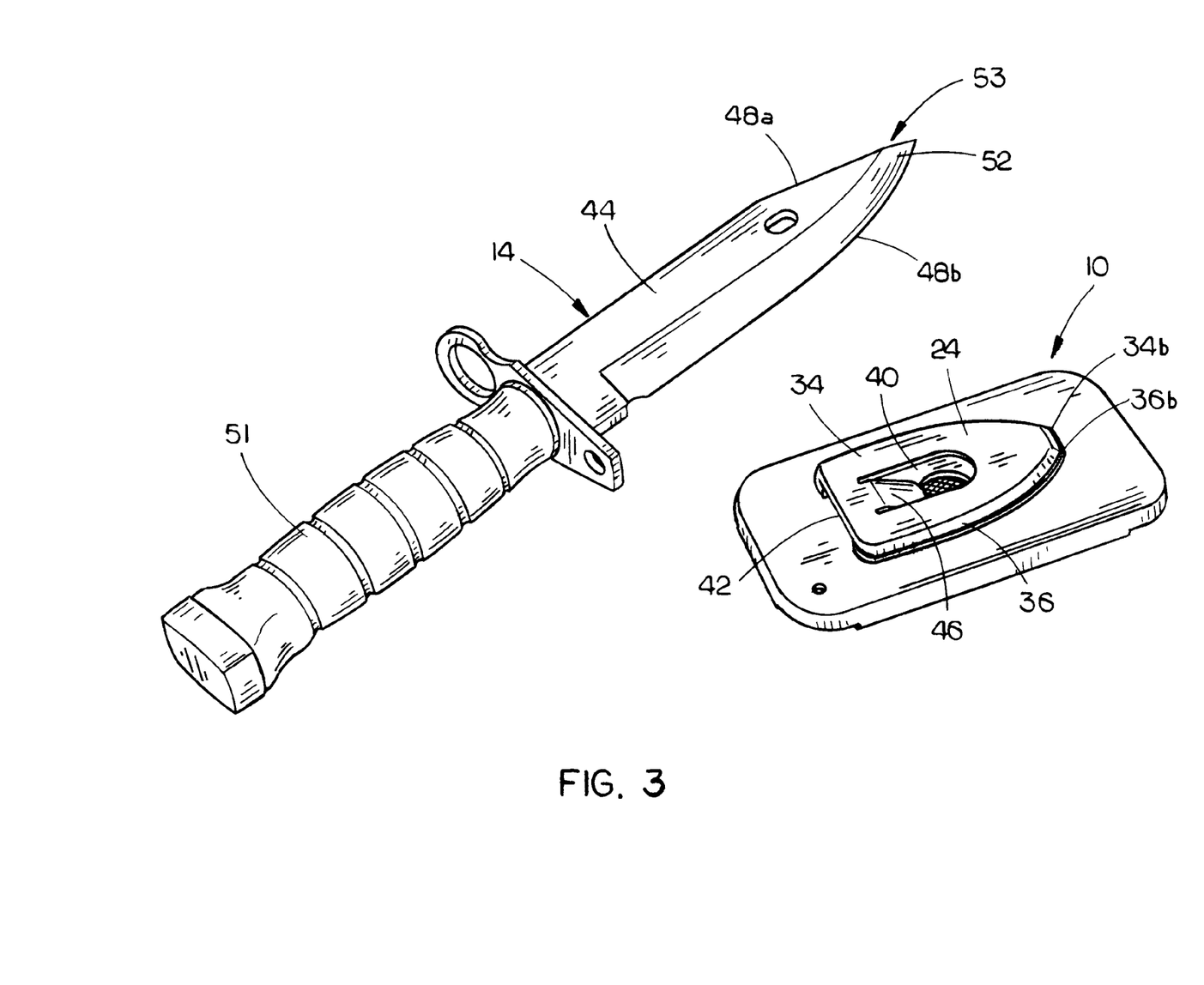
FIG. 3 is a rear perspective view showing the mount removed from the knife.

Referring now to FIG. 3, the blade 44 of knife 14 is joined with and extends from a handle 51 of the knife. The knife 14 is an M9 bayonet and thus is operable to be mounted to a rifle, such as an M4 or M16 assault rifle, as is well known in the art. The first and second edges 48*a* and 48*b* of the knife blade 44 meet at a blade tip 52, which is at a distal end 53 of the knife opposite handle 51.

Referring to FIG. 3, housing 24 of mount 10 is sized and configured such that the housing 24 substantially encloses the blade tip 52 when a portion of the blade 44 is positioned in cavity 40. Further, the housing 24 preferably substantially encloses a portion of the distal end 53 of the knife 14 and at least a portion of the first and second edges 48*a* and 48*b* of the blade 44 adjacent to the tip 52. Preferably, the housing 24 is sized and configured to enclose approximately between 1 to 5 inches of the distal end 53 of blade 44, including the first and second edges 48*a* and 48*b*. Most preferably, the housing 24 encloses approximately between 1 to 3 inches of the distal end 53 of blade 44, including first and second edges 48*a* and 48*b*, or between 2 to 4 inches of the distal end 53 of blade 44. Because the housing 24 encloses the knife tip 52, distal end 53 of the knife 14 and/or portions of the first and second edges 48*a* and 48*b* of the blade 44, a user of the mount 10 can safely and quickly engage and disengage the mount 10 with the knife 14 without danger of cutting his or her hand on the knife blade 44. The ability of the mount 10 to be safely and quickly engaged and disengaged with a knife is a particularly advantageous feature because it allows individuals facing dangerous life or death situations, such as military soldiers and police officers, to rely on and use the mount 10 to enhance their view of a potentially dangerous area.

Although the mount 10 is preferably configured as described above, the following non-exhaustive list of alternative embodiments is also within the scope of the present invention. Although the housing 24 is preferably integral with the base 18, it is within the scope of the invention for housing 24 to be separate from the base 18 and for the housing 24 to be coupled with the base 18 by any suitable means. For example, the housing 24 may be adhered or welded to the rear surface 22. Alternatively, or in conjunction with the housing 24 being welded or adhered to the rear surface 22, the rear surface 22 of the base 18 may include a groove that receives a portion of the housing 24 for mounting the housing 24 to the base 18. Additionally, while the housing 24 and base 18 are preferably constructed from the same material, the housing 24 may be constructed from any of the above listed materials while the base 18 is constructed from a different one of the above listed materials. For example, the housing 24 could be constructed from a non-resilient material while the base 18 is constructed from a resilient material. While the base 18 and side wall 28 are preferably sized and configured as described above, the base 18 and side wall 28 may have any shape that is suitable for retaining any type of mirror that is suitable to be mounted on a knife. Also, while the side wall 28 is preferably integral with front surface 20 of base 18, it is within the scope of the invention for the side wall 28 to be separate from the front surface 20 and joined with the front surface 20 by any suitable means. For example, the side wall 28 could be adhered or welded to the front surface 20. In an alternative embodiment, the second, curved section 32 of side wall 28 may be continuous around the entire periphery of the front surface 20 like the first section 30. Although the housing 24 and side walls 34 and 36 are preferably sized and configured for receiving the blade of an M9 bayonet as described above, it is within the scope of the invention for the housing 24 and side walls 34 and 36 to have a different shape and configuration that is suitable for receiving a different type of knife. Additionally, it is within the scope of the present invention for mount 10 to have an alternative or additional structure besides tab 46 and side walls 34 and 36 that is capable of engaging the knife 14 and preventing the mount 10 from falling off of the knife 14 when in use.

Figure 7:
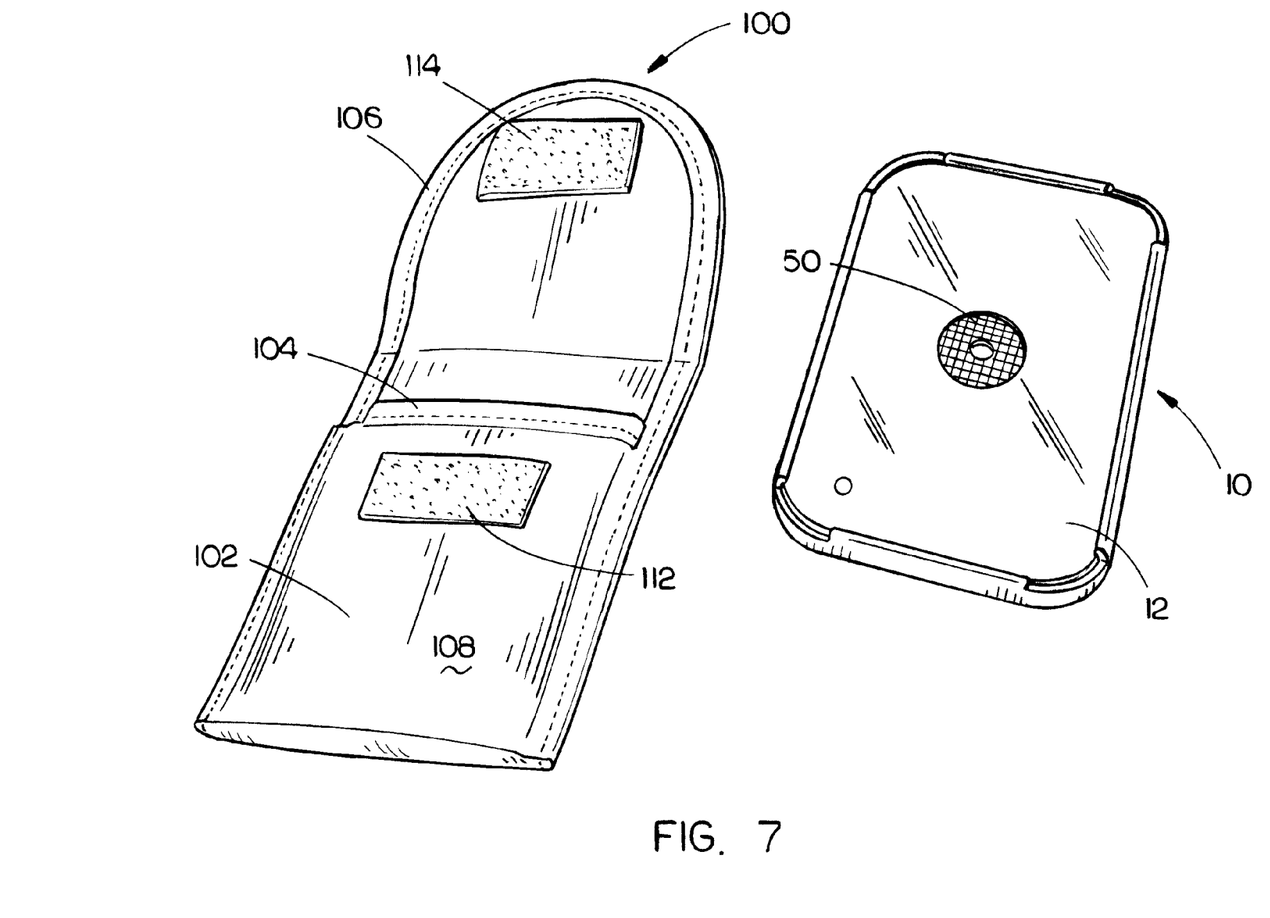
FIG. 7 is a perspective view of the mount and a carrying case.
Figure 8:
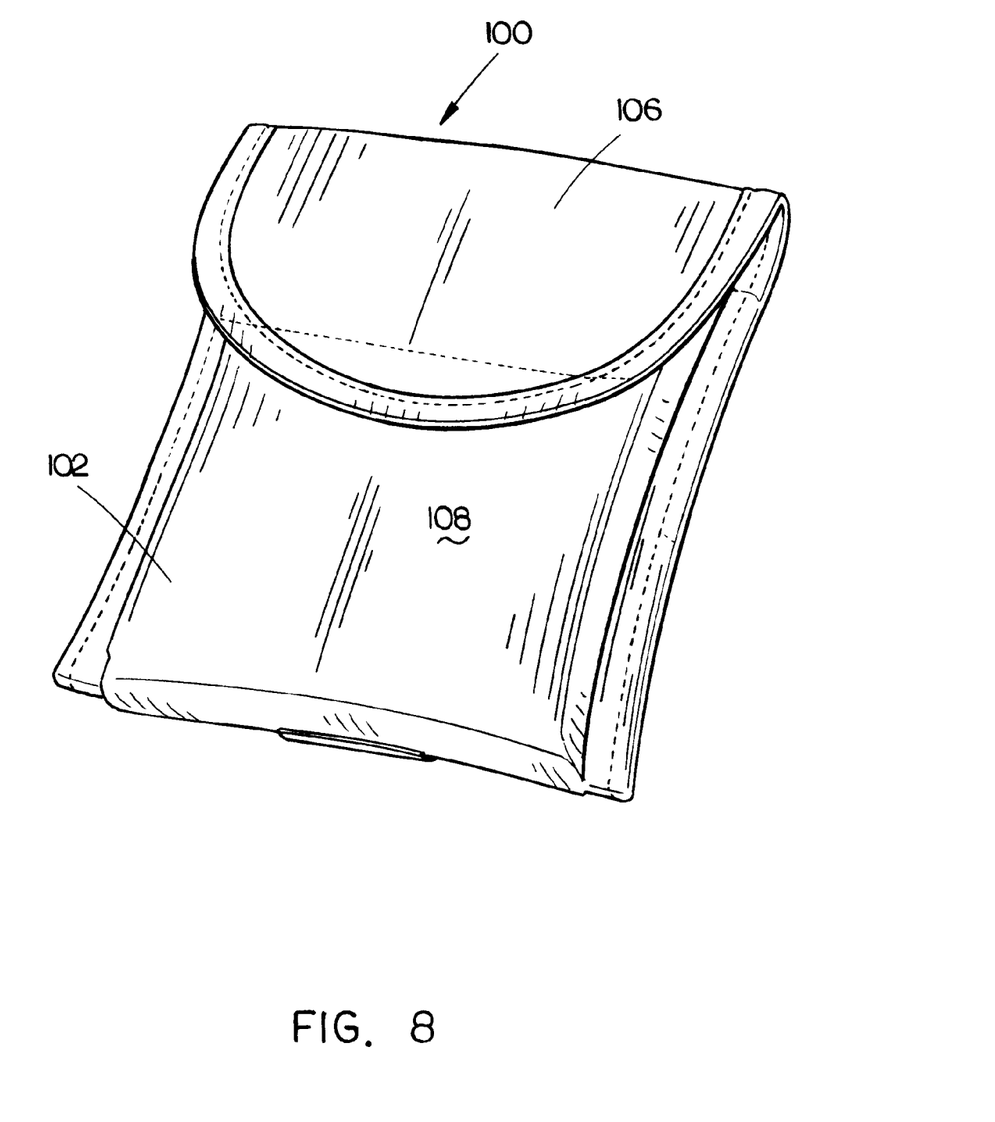
FIG. 8 is a front perspective view of the carrying case.
Figure 9:
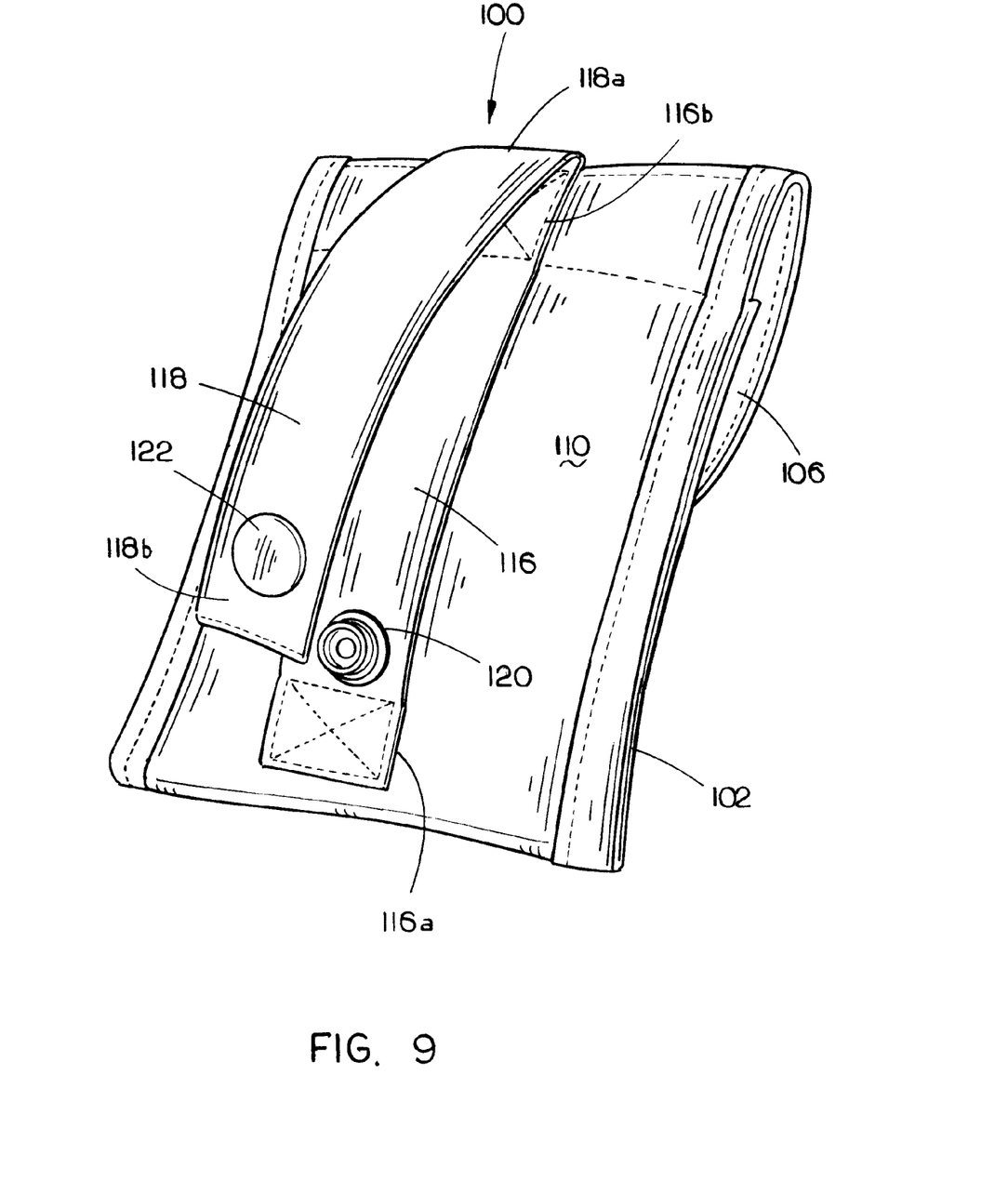
FIG. 9 is a rear perspective view of the carrying case.

Referring now to FIGS. 7-9, an optional carrying case for the mount 10 and mirror 12 is identified with the reference numeral 100. The carrying case 100 includes a pouch 102 with an opening 104, and a flap 106 that is operable to cover the opening 104. The pouch 102 is sized and configured for receiving mount 10 and mirror 12, and the flap 106 is operable to cover the opening 104 and thereby retain the mount 10 and mirror 12 within the pouch 102. The pouch 102 has a front side 108, shown in FIGS. 7 and 8, and a rear side 110, shown in FIG. 9, that are stitched together along edges thereof. A rectangular piece of hook or loop material 112 is affixed to the front side 108 of the pouch 102, and a corresponding piece of hook or loop material 114 is affixed to the flap 106. FIG. 8 shows the configuration of the carrying case 100 when the hook and loop material 112 and 114 are engaged. When the hook and loop material 112 and 114 are engaged, flap 106 covers opening 104 for securely retaining mount 10 and mirror 12 within pouch 102.

Referring now to FIG. 9, there is an elastic strap 116 that is affixed at its ends 116a and 116b to the rear side 110 of the pouch 102. There is another strap 118 with an end 118a that is integral with the end 116b of strap 116 and a free end 118b that extends over strap 116. A snap stud 120 is affixed to strap 116 adjacent end 116a, and a corresponding snap socket 122 is affixed to strap 118 adjacent free end 118b. Straps 116 and 118 are operable for securing the carrying case 100 to any desirable item such as a belt, an item of clothing or a bag. For example, a belt could be positioned between strap 116 and rear side 110. Alternatively, a belt could be positioned between straps 116 and 118 while snap socket 122 engages snap stud 120. With the belt positioned between straps 116 and 118, the user can easily remove the carrying case 100 from the belt by disengaging snap socket 122 from snap stud 120.

In operation, a user of mount 10 first removes the mount 10 from carrying case 100 if the optional carrying case 100 is being used to store the mount 10. Next, if mirror 12 is not already engaged by the side wall 28 of base 18, the user positions the mirror 12 over the front surface 20 of the base 18 and pushes the mirror 12 toward the front surface 20 until the mirror 12 snaps into place adjacent front surface 20 where it is frictionally engaged by side wall 28. The user then grasps the mount 10 with his or her hand 16 in the manner shown in FIG. 1 and slides the knife blade 44 through the gap 42 between side walls 34 and 36 of housing 24 (see FIG. 3). The user slides the mount 10 downward on the blade 44 toward the handle 51 of the knife 14 until the blade tip 52 is adjacent to the joined ends 34b and 36b of the side walls 34 and 36, respectively. In this position, the tab 46 and side walls 34 and 36 of the housing 24 frictionally retain the mount 10 on the knife 14, as set forth in detail above.

Further, as described above, the process of mounting the mount 10 on a knife can be accomplished in a matter of seconds, which is particularly advantageous for individuals facing dangerous life or death situations, such as military soldiers and police officers, because they can rely on and use the mount 10 and mirror 12 to enhance their view of a potentially dangerous area. When the user wishes to remove the mount 10 from the knife 14, the mount 10 is simply grasped by the user's hand 16 in the manner indicated in FIG. 1 and pulled away from the handle 51 of the knife 14 until the knife blade 44 is no longer positioned within the housing 24 of the mount 10.

From the foregoing it will be seen that this invention is one well adapted to attain all ends and objectives herein-above set forth, together with the other advantages which are obvious and which are inherent to the invention.

Since many possible embodiments may be made of the invention without departing from the scope thereof, it is to be understood that all matters herein set forth or shown in the accompanying drawings are to be interpreted as illustrative, and not in a limiting sense.

While specific embodiments have been shown and discussed, various modifications may of course be made, and the invention is not limited to the specific forms or arrangement of parts and steps described herein, except insofar as such limitations are included in the following claims. Further, it will be understood that certain features and subcombinations are of utility and may be employed without reference to other features and subcombinations. This is contemplated by and is within the scope of the claims.

What is claimed and desired to be secured by Letters Patent is as follows:

1. A mount for mounting a mirror on a knife, wherein said knife comprises a blade, a blade tip and a handle, comprising:
   a base that is configured to engage the mirror; and
   a housing coupled with said base, wherein said housing comprises first and second side walls each joined with and extending from said base, and a back wall that is joined with and extends between said first and second side walls, and wherein said first and second side walls, said back wall, and said base define a cavity that is configured for receiving at least a portion of the knife blade such that the blade tip is substantially enclosed by said first and second side walls, said back wall, and said base when the blade is positioned in said cavity.

2. The mount of claim 1, wherein said blade has first and second edges that meet at the tip, and wherein said housing substantially encloses the tip and portions of the first and second edges adjacent to the tip.

3. The mount of claim 2, wherein said housing encloses approximately between 1 to 5 inches of the first and second edges of the knife.

4. The mount of claim 3, wherein said housing encloses approximately between 2 to 4 inches of the first and second edges of the knife.

5. The mount of claim 1, wherein said housing is configured to engage a portion of the blade that is positioned in said cavity for retaining the housing on the blade.

6. The mount of claim 1, wherein said back wall comprises a tab extending into said cavity, wherein said tab exerts pressure on the blade when the blade is positioned in said cavity.

7. The mount of claim 1, wherein said first and second side walls of said housing are curvilinear, wherein said first and second side walls are mirror images of each other, and wherein said first and second side walls each have first ends that are spaced apart and second ends that are joined.

8. The mount of claim 1, wherein there are aligned openings in said back wall of said housing and said base.

9. The mount of claim 1, wherein said base is formed from a resilient material.

10. The mount of claim 1, wherein said housing is integral with said base.

11. A mount for mounting a mirror on a knife, wherein said knife comprises a blade, a blade tip and a handle, comprising:
   a base that is configured to engage the mirror, wherein said base comprises front and rear surfaces, wherein said front surface is adjacent to the mirror when it is engaged by the base; and a housing coupled with and extending from said rear surface of said base, wherein said housing defines a cavity that is configured for receiving at least a portion of the knife blade such that the blade tip is substantially enclosed by said housing when the blade is positioned in said cavity.

12. The mount of claim 11, wherein said base comprises a side wall that is joined with and extends from a peripheral edge of said front surface.

13. The mount of claim 12, wherein said side wall of said base comprises a first section that is joined with and is generally perpendicular to said front surface, and a second, curved section that is joined to said first section and that partially extends over said front surface.

14. The mount of claim 12, wherein said side wall is operable to frictionally engage the mirror.

15. A mount for mounting a mirror on a knife, wherein said knife comprises a blade having a distal end, comprising:
 a base that is configured to engage the mirror, wherein said base comprises front and rear surfaces, wherein said front surface is adjacent to the mirror when it is engaged by the base; and
 a housing coupled with and extending from said rear surface of said base, wherein said housing comprises first and second side walls each joined with and extending from said rear surface of said base, and a back wall that is joined with and extends between said first and second side walls, and wherein said first and second side walls, said back wall, and said rear surface of said base define a cavity that is configured for receiving at least a portion of the knife blade such that the distal end of the blade is substantially enclosed by said first and second side walls, said back wall, and said rear surface of said base when the blade is positioned in said cavity.

16. The mount of claim 15, wherein the housing encloses approximately between 1 to 5 inches of the distal end of the blade.

17. The mount of claim 16, wherein the housing encloses approximately between 2 to 4 inches of the distal end of the blade.

18. The mount of claim 15, wherein said back wall comprises a tab extending into said cavity, wherein said tab exerts pressure on the blade when the blade is positioned in said cavity.

19. The mount of claim 15, wherein said base comprises a side wall that is joined with and extends from a peripheral edge of said front surface.

20. The mount of claim 19, wherein said side wall of said base comprises a first section that is joined with and is generally perpendicular to said front surface, and a second, curved section that is joined to said first section and that partially extends over said front surface.

* * * * *